United States Patent
Morita et al.

(10) Patent No.: US 6,710,124 B2
(45) Date of Patent: Mar. 23, 2004

(54) WATER BASE COATING MATERIAL COMPOSITION AND PRODUCTION PROCESS

(75) Inventors: Yoshitsugu Morita, Chiba Prefecture (JP); Kazuo Kobayashi, Chiba Prefecture (JP); Ken Tanaka, Chiba Prefecture (JP)

(73) Assignee: Dow Corning Toray Silicone, Co. Ltd., Tokyo (JP)

( * ) Notice: Subject to any disclaimer, the term of this patent is extended or adjusted under 35 U.S.C. 154(b) by 341 days.

(21) Appl. No.: 09/940,314

(22) Filed: Aug. 27, 2001

(65) Prior Publication Data

US 2002/0055557 A1 May 9, 2002

(30) Foreign Application Priority Data

Sep. 8, 2000 (JP) ........................................ 2000-272994

(51) Int. Cl.$^7$ ........................... C08L 83/04; C08L 43/04
(52) U.S. Cl. ........................ 524/806; 524/506; 524/588
(58) Field of Search ................................ 524/806, 506, 524/588

(56) References Cited

U.S. PATENT DOCUMENTS

| | | | |
|---|---|---|---|
| 5,708,057 A | | 1/1998 | Morita et al. ................ 523/402 |
| 5,871,761 A | * | 2/1999 | Kuwata et al. ............. 424/401 |
| 6,476,123 B1 | * | 11/2002 | Morita et al. ................ 524/837 |
| 6,534,126 B1 | * | 3/2003 | Blackwood et al. ..... 427/407.1 |

FOREIGN PATENT DOCUMENTS

| | | |
|---|---|---|
| JP | 11-140191 | 5/1999 |
| WO | WO 99/53889 | 10/1999 |

* cited by examiner

*Primary Examiner*—Tae H. Yoon
(74) *Attorney, Agent, or Firm*—Jim L. DeCesare

(57) ABSTRACT

Water base coating material compositions form coating films of superior flat finish properties. They contain silicone particles with at least two kinds of different average particle size. According to the method of making the composition, a water base coating material composition can be formed by adding an aqueous suspension of silicone particles to a water base coating material composition where the aqueous suspension contains at least two kinds of silicone particles with different average particle size.

2 Claims, No Drawings

WATER BASE COATING MATERIAL COMPOSITION AND PRODUCTION PROCESS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a water base coating material composition, and to a production process for making the composition. In particular, it relates to a water base coating material composition which will form a coating film of superior flat finish properties, and the process for producing it is highly efficient.

BACKGROUND OF THE INVENTION

Some water base coating material compositions for forming coating films that contain silicone particles and a flat finish, and processes for preparing some water base coating material compositions by adding an aqueous suspension of silicone particles to water base coating material compositions are described in U.S. Pat. No. 5,708,057 (Jan. 13, 1998), and in Japanese Unexamined Patent Application Publication No. Hei 11[1999]-140191). However, flat finishing properties of coating films of such water base coating material compositions have not been adequate.

BRIEF SUMMARY OF THE INVENTION

Therefore, it is the object of the invention to provide a water base coating material composition which will form a coating film of superior flat finishing properties, and to provide a process for producing the composition in a highly efficient manner.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The water base coating material composition of the invention contains silicone particles are made up of at least two kinds of silicone particles of different average particle sizes. The process for production of the water base coating material composition of the invention produces the composition by adding an aqueous suspension of silicone particles to a water base coating material composition. The aqueous suspension contains at least two kinds of silicone particles of different average particle sizes.

In the water base coating material composition of the invention, there are no particular limitations regarding the composition, so long as it contains silicone particles, and is prepared by emulsifying or dissolving in water the resin components of a coating material. In addition, upon application, it should form a coating film as a result of curing or drying of the resin components in the coating material due to moisture removal. It can be a room temperature curable composition, room temperature drying composition, or a heat setting compositions. The coating materials referred to herein are ones used for protecting the surface of objects or changing their outside appearance and shape, and include such materials as paints which contain pigments, and materials called coating agents or varnishes which do not contain pigments.

Some representative examples of water based coating material compositions suitable for use according to the invention include polyurethane resin based compositions, alkyd resin based compositions, aminoalkyd resin based compositions containing an amino resin and an alkyd resin, epoxy resin based compositions, acrylic resin based compositions, silicone modified epoxy resin based compositions, silicone modified polyester resin based compositions, and silicone resin based compositions.

In order not to ruin the outside appearance of the coating film, the average particle size of the silicone particles in the water base coating material composition should preferably be 0.1–200 $\mu$m, especially 0.1–100 $\mu$m. The shape of the silicone particles can be spherical, oblate, or amorphous. It is preferably spherical or oblate, and is especially spherical, which imparts superior flat finish properties to the coating film and dispersibility in the water base coating material composition. The consistency of the silicone particles can be rubbery, gel like, or resin like, but it is preferably rubbery or resin like.

The water base coating material composition contains at least two kinds of silicone particles of different average particle sizes. They comprise silicone particles with an average particle size of 0.1–4 $\mu$m exclusive of 4 $\mu$m, and silicone particles with an average particle size of 4–200 $\mu$m. Preferably, the silicone particles comprise silicone particles with an average particle size of 0.1–3.5 $\mu$m and silicone particles with an average particle size of 4–200 $\mu$m; and especially silicone particles with an average particle size of 0.1–3.5 $\mu$m and silicone particles with an average particle of 4 $\mu$m to 100 $\mu$m.

The consistency of the silicone particles of smaller average particle size can be rubbery or resin like, and the consistency of the silicone particles of the larger average particle size can be rubbery. However, to impart excellent scratch resistance to coating films, it is preferable for both consistencies to be rubbery. The proportion of silicone particles of smaller average particle size and silicone particles of larger average particle size, in terms of weight ratio, is 0.1:1 to 1:0.1, preferably 0.2:1 to 1:0.2, especially 0.5:1 to 1:0.5.

The silicone particles may be prepared by any process, and among some examples of processes that can be used are (i) silicone resin, i.e., silsesquioxane, particles prepared by subjecting hydrolyzable silanes such as organotrihalosilane and organotrialkoxysilane to a hydrolytic condensation reaction using a catalyst; (ii) silicone rubber particles prepared by subjecting a silicone composition of alkenyl containing polyorganosiloxanes and polyorganosiloxanes that contain silicon bonded hydrogen atoms to emulsification and addition polymerization in an aqueous solution of surface active agent; and (iii) silicone particles prepared by subjecting a silicone composition of silanol containing polyorganosiloxanes, polyorganosiloxanes containing silicon bonded hydrogen atoms or silicon compounds containing silicon bonded hydrolyzable groups, and optionally an organosilicon compound containing organic functional groups and silicon bonded hydrolyzable groups, to emulsification and condensation in an aqueous solution of surface active agent. Process (iii) is especially preferable.

In process (iii), the silanol containing polyorganosiloxane is the primary component of the silicone composition and has at least two silanol groups per molecule. The molecular structure of the polyorganosiloxane can be linear, branched, or network, but the structure is preferably linear and partially branched. The silanol groups are preferably bonded to terminal ends of the molecular chain. Among organic groups bonded to silicon atoms in the polyorganosiloxane are substituted or unsubstituted monovalent hydrocarbon groups including alkyl groups such as methyl, ethyl, propyl, and butyl; alkenyl groups such as vinyl and allyl; aryl groups such as phenyl; aralkyl groups such as benzyl and phenethyl; cycloalkyl groups such as cyclopentyl and cyclohexyl; and halogentated alkyl groups such as 3-chloropropyl and 3,3,3-trifluoropropyl.

The polyorganosiloxane containing silicon bonded hydrogen atoms or the silicon compound having silicon bonded hydrolyzable groups is the component of the composition used for crosslinking with the silanol containing polyorganosiloxane. It should contain at least three silicon bonded hydrogen atoms per molecule. The organic groups bonded to silicon atoms in this polyorganosiloxane can be the same as the organic groups in the silanol containing polyorganosiloxane noted above. Its molecular structure can be linear, partially branched linear, branched, network, or cyclic.

This polyorganosiloxane is exemplified by polymethylhydrogensiloxanes having both terminals of the molecular chain endblocked with trimethylsiloxy groups; copolymers of methylhydrogensiloxane and dimethylsiloxane having both terminals of the molecular chain end blocked with trimethylsiloxy groups; copolymers of methylhydrogensiloxane and dimethylsiloxane having both terminals of the molecular chain endblocked with dimethylhydrogensiloxy groups; cyclic methylhydrogensiloxanes; and polyorganosiloxanes obtained by substituting ethyl or other alkyl groups, or phenyl or other aryl groups, for all or some methyl groups in such organopolysiloxanes. The content of this polyorganosiloxane in the silicone composition should be sufficient for crosslinking with the silanol containing polyorganosiloxane, and is preferably in the amount of 0.1–50 parts by weight per 100 parts by weight of silanol containing polyorganosiloxane.

The silicon compound containing silicon bonded hydrolyzable groups should contain at least three silicon bonded hydrolyzable groups per molecule exemplified by alkoxy groups such as methoxy, ethoxy, and methoxyethoxy; oxime groups such as methylethylketoxime; acetoxy groups; and aminoxy groups. It is exemplified by methyltrimethoxysilane, ethyltrimethoxysilane, methyltri(methoxyethoxy)silane, tetramethoxysilane, and tetraethoxysilane. The silicon compound containing silicon bonded hydrolyzable groups can also include their products of partial hydrolytic condensation such as methyl tri(methyl ethyl ketoxime)silane, ethyl tri(methyl ethyl ketoxime) silane, tetra(methyl ethyl ketoxime)silane, methyltriacetoxysilane, ethyltriacetoxysilane, tetraacetoxysilane, methyltri(trimethylaminoxy)silane, ethyltri(trimethylaminoxy)silane, and tetra(polymethylaminoxy)silane. However, most preferred are alkoxysilanes and products of their partial hydrolytic condensation, especially alkylpolysilicates and products of partial hydrolytic condensation of tetraalkoxysilane. The content of the silicon compound in the silicone composition should be sufficient for crosslinking with the silanol containing polyorganosiloxane, and is preferably present in the amount of 0.1–50 parts by weight per 100 parts by weight of silanol containing polyorganosiloxane.

Optionally, the silicone composition may contain an organosilicon compound containing organic functional groups and silicon bonded hydrolyzable groups. The organic functional groups are exemplified by alkyl groups, (meth)acrylic groups, epoxy groups, mercapto groups, amino groups, and alkenyl groups containing not less than five carbon atoms. The silicon bonded hydrolyzable groups in the optional organosilicon compound can be the same as the corresponding groups noted in the preceding paragraph.

Some examples of the optional organosilicon compound include (i) alkyl containing alkoxysilanes such as pentyltrimethoxysilane, hexyltrimethoxysilane, octyltrimethoxysilane, and products of their partial hydrolytic condensation; (ii) (meth)acrylic containing alkoxysilanes such as 3-methacryloxypropyltrimethoxysilane, 3-methacryloxypropylmethyldimethoxysilane, 3-methacryloxypropyldimethylmethoxysilane, and products of their partial hydrolytic condensation; (iii) epoxy containing alkoxysilanes such as 3-glycidoxypropyltrimethoxysilane, 3-glycidoxypropyl methyldimethoxysilane, 2-(3,4-epoxycyclohexyl)ethyl trimethoxysilane, 2-(3,4-epoxycyclohexyl)ethyl methyldimethoxysilane, 4-oxiranylbutyl methyldimethoxysilane, 8-oxiranyloctyl trimethoxysilane, 8-oxiranyloctyl triethoxysilane, 8-oxiranyloctyl methyldimethoxysilane, and products of their partial hydrolytic condensation; (iv) mercapto containing alkoxysilanes such as 3-mercaptopropyltrimethoxysilane, 3-mercaptopropylmethyldimethoxysilane, and products of their partial hydrolytic condensation; (v) amino containing alkoxysilanes such as 3-aminopropyltrimethoxysilane, N-(2-aminoethyl)-3-aminopropyltrimethoxysilane, N-(2-aminoethyl)-3-aminopropylmethyl dimethoxysilane, 3-anilinopropyltrimethoxysilane, and products of their partial hydrolytic condensation; and (vi) alkenyl containing alkoxysilanes such as vinyltrimethoxysilane, allyltrimethoxysilane, hexenyltrimethoxysilane, and products of their partial hydrolytic condensation. The amount of optional organosilicon compound used in the silicone composition when it is included is 0.1–10 weight percent, preferably 0.5–5 weight percent of the silicone composition.

The silicone composition may contain other optional ingredients such as a reinforcing filler such as precipitated silica, fumed silica, calcined silica, and fumed titanium oxide; a non-reinforcing filler such as crushed quartz, diatomaceous earth, asbestos, aluminosilicic acid, iron oxide, zinc oxide, and calcium carbonate; fillers obtained by treating reinforcing and non-reinforcing fillers with organochlorosilanes, organoalkoxysilanes, organosilazanes, and organosiloxane oligomers; pigments; epoxy and amino containing organic compounds; heat resisting agents; flame retardants; plasticizers; and noncrosslinkable organopolysiloxanes.

A colloid mill, Homomixer, Homogenizer, or other piece of standard emulsification equipment is used to emulsify the silicone composition in an aqueous solution of surface active agent. A condensation reaction catalyst can be introduced into the silicone composition in advance, or it may be added to an aqueous emulsion of the silicone composition after preparing the emulsion. The latter process is preferred because it enables reduction in average particle size of the silicone particles and makes it possible to reduce variation in particle size.

An organotin catalyst is the preferred condensation reaction catalyst, including organotin (II) oxides with not more than 10 carbon atoms, and saturated fatty acid salts of tin (II) with not more than 10 carbon atoms. Some representative examples are tin (II) acetate, tin bis(2-ethylhexanoate), tin bis(neodecanoate), tin (II) 2,4-pentadionate, and tin (II) octylate. The amount of condensation reaction catalyst present should be 0.01–20, preferably 0.1–10 parts by weight per 100 parts by weight of silicone composition.

The surface active agent is preferably an anionic surface active agent because the resulting silicone rubber particles do not adversely affect the coating film. Anionic surface active agents can be exemplified by alkylbenzenesulfonic acid salts such as hexylbenzenesulfonic acid salts, octylbenzenesulfonic acid salts, decylbenzenesulfonic acid salts, dodecylbenzenesulfonic acid salts, cetylbenzenesulfonic acid salts, and myristylbenzenesulfonic acid salts; sulfonic acid salts such as alkylnaphthalenesulfonic acid salts, sulfosuccinic acid salts, n-olefinsulfonic acid salts, and N-acylsulfonic acid salts; carboxylic acid salts such as soap, N-acylamino acid salts, poly(oxyethylene) or poly(oxyethylene) alkyl ether carboxylic acid salts, and acylated peptides; sulfuric acid ester salts such as sulfated oil, alkyl sulfate, alkyl ether sulfate, poly(oxyethylene) or poly(oxyethylene) alkylallyl ether sulfate, and alkylamide sulfate; alkyl phosphates, poly(oxyethylene) or poly(oxyethylene) alkylallyl ether phosphates; and mixtures of any two or more such compounds. The amount of anionic surface active agent should be 0.05–20, preferably 0.1–10 weight percent of the emulsion.

Silicone rubber particles are prepared by crosslinking the silicone composition emulsified in the aqueous emulsion of the silicone composition. It is preferred to maintain the temperature of the emulsion at 5–70° C. If the temperature of the emulsion is too low, the crosslinking reaction proceeds slowly, while if the temperature is higher, the stability of the emulsion is decreased.

The content of silicone particles in the water base coating material composition should be 0.01–50, preferably 0.1–50, and most preferably 0.1–20 parts by weight per 100 parts by weight of solid matter in the water base coating material composition. In addition, it may contain other known flat finish imparting agents, inorganic fillers, thixotropicity controlling agents, thickeners, and pigments. The water base coating material composition of the invention can be applied by spray coating, electrostatic coating, dip coating, curtain flow coating, roll coating, and shower coating. It forms coating films of superior flat finish properties.

In accordance with processes used for preparing water base coating material compositions of the invention, an aqueous suspension of silicone particles is added to the water base coating material composition as an aqueous suspension containing at least two kinds of silicone particles with different average particle size.

There are a number of ways of preparing water base coating material compositions as described above with at least two kinds of silicone particles of different average particle size. For example, an aqueous suspension of at least two silicone particles of different average particle size can be mixed with the water base coating material composition. This can be carried out by using a single aqueous suspension of silicone particles obtained by mixing one aqueous suspension of silicone particles of an average particle size and another aqueous suspension of silicone particles of a different average particle size to the water base coating material composition. Alternatively, two separate aqueous suspensions of silicone particles can be added to the water base coating material composition one after another. When one aqueous suspension of silicone particles is mixed with another aqueous suspension of silicone particles of a different average particle size, it is preferred to use a colloid mill, Homomixer, or Homogenizer device.

APPLICATION EXAMPLES

The water base coating material composition and the process for making it are explained in more detail in the following application examples. In these examples, the particle size distribution of silicone particles was obtained by subjecting an aqueous suspension of the silicone particles to measurements using laser scattering particle size distribution analyzer Model LA-500 of Horiba, Ltd. The average particle size of the silicone particles is represented by the mean diameter obtained which is the diameter corresponding to 50 percent of the cumulative distribution.

Reference Examples 1–3

A silicone rubber composition was prepared by uniformly mixing 84.7 parts by weight of a dimethylpolysiloxane of the formula $HO[(CH_3)_2SiO]_{11}H$; 10.5 parts by weight of ethyl polysilicate; and 4.5 parts by weight of 3-glycidoxypropyltrimethoxysilane. After emulsifying the silicone rubber composition in an aqueous solution of one part by weight of sodium poly(oxyethylene) lauryl sulfate and 30 parts by weight of demineralized water, further emulsification was carried out using a colloid mill. An aqueous emulsion of the silicone rubber composition was prepared by diluting the emulsion with 58 parts by weight of demineralized water. In the same manner, two other aqueous emulsions of the silicone rubber composition of different average particle size were prepared by changing the rotating speed of the colloid mill.

An aqueous emulsion of tin octylate with an average particle size of 1.2 $\mu$m was prepared by emulsifying one part by weight of tin (II) octylate using 0.25 parts by weight of sodium poly(oxyethylene) lauryl sulfate and 9.75 parts by weight of demineralized water. It was added and uniformly mixed with each of the three aqueous emulsions of the silicone rubber composition. All of the emulsions were allowed to stand for one day to cure the emulsified silicone rubber composition, thus preparing gel free uniform aqueous suspensions of silicone particles (A)–(C). The average particle size of the silicone particles in the aqueous suspension of silicone particles (A) was 2.2 $\mu$m and its particle size distribution was 0.1–100 $\mu$m. The average particle size of the silicone particles in the aqueous suspension of silicone particles (B) was 3.1 $\mu$m and its particle size distribution was 0.1–100 $\mu$m. The average particle size of the silicone particles in the aqueous suspension of silicone particles (C) was 5.3 $\mu$m and its particle size distribution was 0.1–100 $\mu$m.

Reference Examples 4–6

Reference Examples 1–3 were repeated except that 3-methacryloxypropyltrimethoxysilane was used instead of 3-glycidoxypropyltrimethoxysilane. Gel free uniform aqueous suspensions of silicone particles (D)–(F) were prepared. The average particle size of silicone particles in the aqueous suspension of silicone particles (D) was 2.1 $\mu$m and its particle size distribution was 0.1–100 $\mu$m. The average particle size of silicone particles in the aqueous suspension of silicone particles (E) was 2.9 $\mu$m and its particle size distribution was 0.1–100 $\mu$m. The average particle size of silicone particles in the aqueous suspension of silicone particles (F) was 5.5 $\mu$m and its particle size distribution was 0.1–100 $\mu$m.

Reference Example 7

2.8 parts by weight of a 1/10 N aqueous solution of sodium hydroxide and 600 parts by weight of demineralized water were placed in a 1-L flask and heated to 50° C. under agitation. 200 parts by weight of methyltrimethoxysilane was added to the solution, it was stirred 10 minutes, and the mixture was allowed to stand for five hours. The aqueous solution was neutralized with acetic acid, and then filtered, washed with water, and washed with methanol. The product was air dried and yielded silicone resin particles with an average particle size of 1.5 μm. An aqueous suspension of silicone particles (G) was prepared by uniformly mixing 64 parts by weight of the silicone resin particles, 5 parts by weight of sodium poly(oxyethylene) lauryl sulfate, and 30 parts by weight of demineralized water.

Application Examples 1–3 and Comparative Examples 1–2

A water base coating material composition was prepared by adding (i) an aqueous suspension of silicone particles obtained by mixing aqueous suspension of silicone rubber particles (A) with aqueous suspension of silicone rubber particles (C) in a 1:1 proportion based on weight ratio of silicone rubber particles, to (ii) a commercially available urethane resin based water base coating material composition of Kansai Paint Co., Ltd. Composition (ii) was used in an amount sufficient to bring the proportion of silicone particles to five parts by weight per 100 parts by weight of solid matter in the water base coating material composition. It was then subjected to vibration agitation 50 times. This composition is identified hereafter as Application Example 1.

Application Example 1 was repeated except that aqueous suspensions of silicone rubber particles (B) and (C) were mixed. This composition is identified hereafter as Application Example 2.

Application Example 1 was repeated except that aqueous suspensions of silicone rubber particles (D) and (F) were mixed. This composition is identified hereafter as Application Example 3.

Application Example 1 was repeated except that only the aqueous suspension of silicone rubber particles (A) was mixed. This composition is identified hereafter as Comparative Example 1.

Application Example 1 was repeated except that only the aqueous suspension of silicone rubber particles (C) was mixed. This composition is identified hereafter as Comparative Example 2.

A coating film with a thickness of 20 μm was formed by applying each of the water base coating material compositions to a polyethylene terephthalate film, and drying the compositions for 10 minutes at 100° C. Glossiness, flat finish properties, light transmissivity, and scratch resistance of the coating films were evaluated as explained below, and the results are shown in Table 1.

Glossiness of Coating Film

Reflectance of the coating film at a light incidence angle of 20°, 600°, and 85° was measured using a micro-TRI-gloss gloss meter of BYK-Gardner, and used to represent glossiness. Smaller numerical values indicate better flat finish properties.

Flat Finish Properties

The coating film was observed by viewing it at an angle of about 45° C. with light projected directly from above the coating film. Evaluations in which the film had excellent flat finish properties did not seem to appear whitish and were indicated by ○; evaluations in which the surface appeared whitish were indicated by Δ; and evaluations in which the flat finish properties of the surface seemed to be very poor were indicated by X.

Light Transmissivity

The coating film was held up to the light of a fluorescent lamp. When the entire coating film had uniform brightness and the fluorescent lamp could not be seen, the evaluation assigned was ○; when a blurred image of the fluorescent lamp could be seen, the evaluation assigned was Δ; and when a dim image of the fluorescent lamp could be seen, the evaluation assigned was X.

Scratch Resistance of Coating Film

The presence of scratches on the coating film surface after rubbing the surface of the coating film with a piece of polypropylene resin five times was determined by visual observation. When there were no scratches on the coating film, it was evaluated ○; when there were small scratches on the coating film, it was evaluated Δ; and when there were large scratches on the coating film, it was evaluated X.

TABLE 1

|  | Application Example 1 | Application Example 2 | Application Example 3 | Comparative Example 1 | Comparative Example 2 |
| --- | --- | --- | --- | --- | --- |
| Glossiness |  |  |  |  |  |
| @ 20° | 5.2 | 4.3 | 3.3 | 15.2 | 13.2 |
| @ 60° | 3.4 | 6.2 | 4.2 | 13.4 | 11.0 |
| @ 85° | 6.3 | 4.2 | 6.2 | 13.7 | 15.4 |
| Flat Finish Properties | ○ | ○ | ○ | X | X |
| Light Transmissivity | ○ | ○ | ○ | X | Δ |
| Scratch Resistance | ○ | ○ | ○ | ○ | ○ |

Application Examples 4–6 and Comparative Example 3

Application Example 1 was repeated except that a commercially available acrylic resin based water base coating material composition was used instead of the urethane resin based water base coating material composition used in Application Example 1. This composition is identified hereafter as Application Example 4.

Application Example 4 was repeated except that aqueous suspensions of silicone rubber particles (E) and (F) were mixed. This composition is identified hereafter as Application Example 5.

Application Example 4 was repeated except that aqueous suspensions of silicone rubber particles (F) and (G) were mixed. This composition is identified hereafter as Application Example 6.

Application Example 4 was repeated except that only the aqueous suspension of silicone rubber particles (B) was mixed. This composition is identified hereafter as Comparative Example 3.

The same procedure used above for evaluating glossiness, flat finish properties, light transmissivity, and scratch resistance of the coating films was used, and results are shown in Table 2.

TABLE 2

|  | Application Example 4 | Application Example 5 | Application Example 6 | Comparative Example 3 |
|---|---|---|---|---|
| Glossiness |  |  |  |  |
| @ 20° | 6.5 | 6.1 | 4.5 | 7.9 |
| @ 60° | 4.1 | 5.5 | 4.8 | 10.2 |
| @ 85° | 5.2 | 5.4 | 6.1 | 8.6 |
| Flat Finish Properties | ○ | ○ | ○ | ○ |
| Scratch Resistance | ○ | ○ | Δ | ○ |

As is evident from Tables 1 and 2, water base coating material compositions according to this invention form coating films of superior flat finish properties.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A coating composition comprising a water base coating material containing silicone rubber particles or silicone resin particles, the particles being of at least two different average particle size, some silicone particles having an average particle size of 0.1–4 μm exclusive of 4 μm while others have an average particle size of 4–200 μm, the silicone particles having an average particle size of 0.1–4 μm exclusive of 4 μm being silicone rubber particles or silicone resin particles, the silicone particles having an averages particle size of 4–200 μm being silicone rubber particles, and wherein the silicone particles having an average particle size of 0.1–4 μm exclusive of 4 μm and the silicone particles having an average particle size of 4–200 μm are present in the coating composition in a ratio of 0.1:1 to 1:0.1 by weight.

2. A method of making coating compositions according to claim 1 comprising adding an aqueous suspension of silicone rubber particles or silicone resin particles to water base coating materials.

* * * * *